(No Model.)  2 Sheets—Sheet 1.

L. ESCHNER.
WATER FILTER.

No. 574,792.  Patented Jan. 5, 1897.

Witnesses:
Charles Be Cow
Fred C. Benner

Inventor:
Louis Eschner
by his Attorneys
Howson & Howson (No Model.) 2 Sheets—Sheet 2.

L. ESCHNER.
WATER FILTER.

No. 574,792. Patented Jan. 5, 1897.

Witnesses:
Charles L. De Cou
Fred C. Benner

Inventor:
Louis Eschner
by his Attorneys
Howson & Howson

UNITED STATES PATENT OFFICE.

LOUIS ESCHNER, OF PHILADELPHIA, PENNSYLVANIA.

WATER-FILTER.

SPECIFICATION forming part of Letters Patent No. 574,792, dated January 5, 1897.

Application filed July 27, 1895. Serial No. 557,302. (No model.)

*To all whom it may concern:*

Be it known that I, LOUIS ESCHNER, a citizen of the United States, residing in Philadelphia, Pennsylvania, have invented certain Improvements in Water-Filters, of which the following is a specification.

One object of my invention is to provide for the ready cleansing of a water-filter by means of the water-flow, and a further object is to render the filter automatic in its action. These objects I attain in the manner hereinafter set forth, reference being had to the accompanying drawings, in which—

Figure 1:
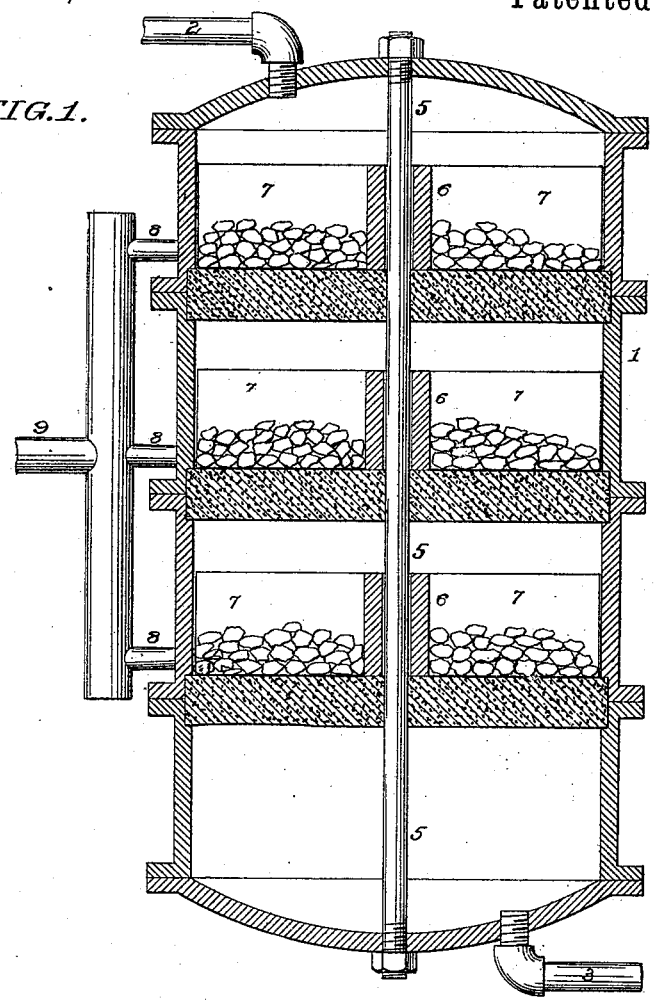
Figure 2:
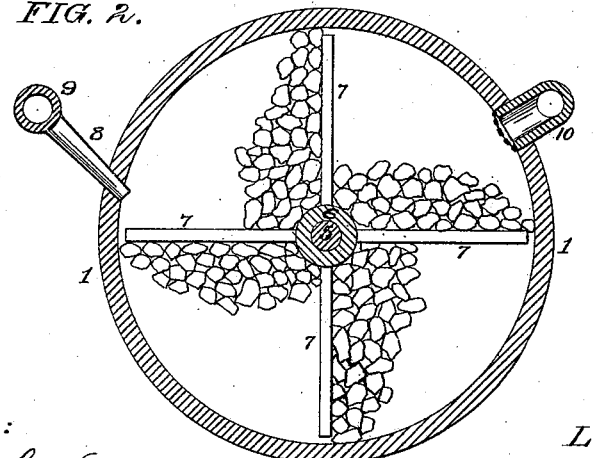
Figure 3:
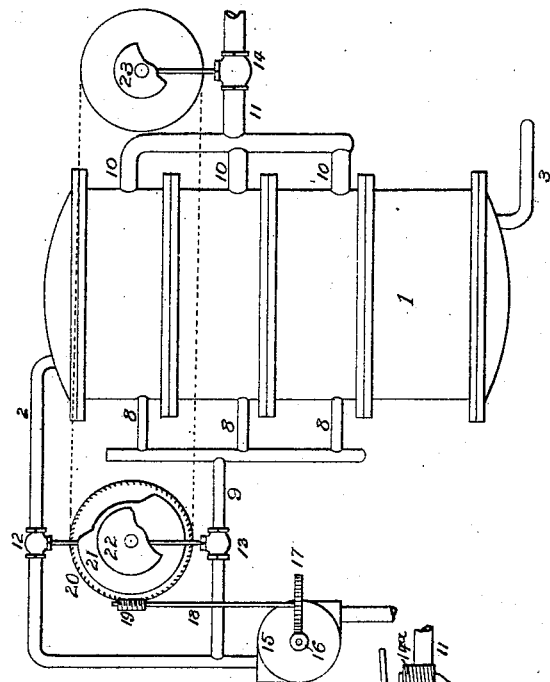
Figure 4:
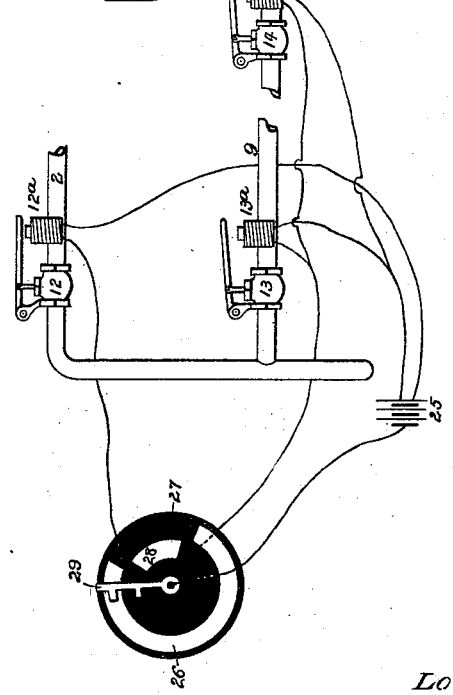

Figure 1 is a vertical section of a filter constructed in accordance with my invention. Fig. 2 is a sectional plan view on the line 2 2, Fig. 1. Fig. 3 is a diagrammatic view illustrating means for automatically operating the valves whereby the flow of water is governed, and Fig. 4 is a diagram illustrating modified means for this purpose.

In Figs. 1 and 2 the casing of the filter is represented at 1, and this casing may be of any desired construction, 2 being the feed-pipe for the unfiltered water, and 3 the discharge-pipe for conveying the filtered water. Within the casing are one or more filtering-blocks 4, which may be composed of any available filtering material, although I prefer to use for the purpose natural-stone filtering-blocks, into which impurities will not penetrate. In the present instance I have shown three of these filtering-blocks in the casing, although it is manifest that a greater or less number of them can be used as desired. The casing is held together by a central bolt 5 passing through the filtering-blocks, and mounted upon this bolt in the chamber above each filtering-block is a scraper consisting of a hub 6, with a series of radiating arms or vanes 7, these vanes resting on the surface of the filtering-block and extending close to the inner wall of the casing, but so as to be freely rotatable within said casing. In advance of each of the vanes 7 is deposited a mass of broken stone or other equivalent abrading material, which rests upon the surface of the filtering-block and is carried forward over the same by the following vane when the scraper is rotated.

The rotation of each scraper is provided for by a nozzle 8, which is in communication with a pipe 9 for supplying water under pressure, so that a forcible jet will escape from the nozzle and will by impact upon the vanes of the scraper cause the rotation of the latter, the water, after performing its duty, escaping from an outlet-pipe 10, communicating with a discharge-pipe 11.

The supply-pipe 2 is provided with a valve 12, and the pipes 9 and 11 are also provided with valves 13 and 14, respectively, and when the filter is in use for filtering purposes said valves 13 and 14 are closed and the valve 12 is opened. When it is desired to clean the filter, however, the valves 13 and 14 are opened, so that a propelling jet acts upon the vanes of each scraper, the water escaping through the pipe 11. During this operation the valve 12 may either be closed or allowed to remain open, it being preferable to close it.

The manipulation of the valves may, if desired, be effected by hand at appropriate intervals, but it is better to render their operation automatic, and for this purpose various means may be employed within the scope of my invention, Figs. 3 and 4 illustrating two different means available for the purpose.

In Fig. 3, 15 represents a water-meter or other available form of motor actuated by the flow of water on its way to the filter, the rotating shaft of this motor having a worm 16, which meshes with a worm-wheel 17 on a shaft 18, the latter having a worm 19, meshing with a worm-wheel 20 on a shaft which carries two cams 21 and 22, the former acting upon the stem of the valve 12, while the cam 22 acts upon the stem of the valve 13.

The stem of the valve 14 is acted upon by a cam 23, similar to the cam 22 and carried by a shaft which is belted or otherwise geared to the shaft carrying the cams 21 and 22. The cams are so formed that at appropriate intervals the valve 12 will be closed and the valves 13 and 14 will be opened either simultaneously with or shortly after the closing of the valve 12, the latter being again opened either simultaneously with or shortly after the closing of the valves 13 and 14. By this means the flow of water is directed to the pipe 2 and thence through the filtering-casing for being filtered or it is directed to the pipe 9 and nozzles 8 and thence through the filtering-chambers, so as to rotate the scrapers therein for cleansing purposes, the operation being wholly automatic.

In Fig. 4 I have illustrated an electromagnetic valve-operating device for the same purpose. In this case each of the valves 12, 13, and 14 has a lever, the free end of which constitutes the armature of an electromagnet 12ª, 13ª, or 14ª, respectively, one end of the coil of each magnet being in communication with one pole of a battery 25 or other generator of electricity. The other end of the coil of the magnet 12ª is in communication with a metallic segment 26, set in an insulated plate 27, which also has another metallic segment 28, connected to the coils of the magnet 13ª and 14ª. The opposite pole of the battery is connected to a rotating arm 29, which is uniformly rotated by means of the water-motor, by a spring-actuated train of gears, or in any other available manner. Electric connection is thus completed alternately through the segments 26 and 28. When the connection is through the segment 26, the electromagnet 12ª attracts the lever of the valve 12 and opens said valve, so as to permit the water to flow through the pipe 2, the valves 13 and 14 being closed owing to the fact that the magnets 13ª and 14ª are not energized. When the circuit is completed through the segment 28, the condition of affairs is reversed, the magnets 13ª and 14ª being now energized, so as to open the valves 13 and 14, and the current through the magnet 12ª being cut off, so as to permit of the closing of the valve 12.

As the rotation of the scrapers depends upon the free escape of the water from the filtering-chambers, I may in some cases effect the starting and stopping of the scrapers simply by opening and closing the valve in the discharge-pipe, the nozzles 8 in this case supplying the water to be filtered when the valve in the pipe 11 is closed and the scrapers are inoperative.

Having thus described my invention, I claim and desire to secure by Letters Patent—

1. A water-filter consisting of a casing having a horizontal filtering-surface, a vaned hub located above said filtering-surface and adapted to be rotated by the water-flow and a loose mass of particles of abrading material resting on the filtering-surface and adapted to be carried around with the vanes, substantially as specified.

2. A water-filter consisting of a casing having a filtering-surface, a scraper adapted to be rotated by the flow of water through the filtering-chamber, supply and discharge pipes for such water and means for opening and closing both the supply and discharge pipes at predetermined intervals, substantially as specified.

3. A water-filter consisting of a casing having a filtering-surface, a scraper located in the filtering-chamber and adapted to be rotated by the flow of water through said chamber, supply and discharge pipes for such water, a pipe for supplying water to the casing for filtering purposes and means for opening and closing, at predetermined intervals, the pipe which supplies the water to be filtered and the pipe which provides for the flow of water for rotating the scraper, substantially as specified.

4. A water-filter in which are combined a casing having a filtering-surface, a scraper located in the filtering-chamber and adapted to be rotated by the flow of water through said chamber, supply and discharge pipes for such water and means for effecting the starting and stopping of the rotative flow at predetermined intervals, one of the elements of such starting and stopping device being a motor actuated by the flow of water on its way to the filter, substantially as specified.

In testimony whereof I have signed my name to this specification in the presence of two subscribing witnesses.

LOUIS ESCHNER.

Witnesses:
FRED C. BENNER,
JOS. H. KLEIN.